United States Patent
Kraus et al.

(10) Patent No.: US 9,808,868 B2
(45) Date of Patent: Nov. 7, 2017

(54) HAND-HELD POWER TOOL

(71) Applicant: Robert Bosch GmbH, Stuttgart (DE)

(72) Inventors: Martin Kraus, Filderstadt (DE); Heiko Roehm, Stuttgart (DE); Joachim Hecht, Magstadt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 578 days.

(21) Appl. No.: 14/523,668

(22) Filed: Oct. 24, 2014

(65) Prior Publication Data

US 2015/0114675 A1  Apr. 30, 2015

(30) Foreign Application Priority Data

Oct. 25, 2013 (DE) .......... 10 2013 221 697

(51) Int. Cl.
*B23B 45/00* (2006.01)
*B25F 5/00* (2006.01)
*B25B 23/14* (2006.01)

(52) U.S. Cl.
CPC .......... *B23B 45/008* (2013.01); *B25B 23/141* (2013.01); *B25F 5/001* (2013.01); *B23B 2270/48* (2013.01)

(58) Field of Classification Search
CPC . B23B 45/008; B25B 23/141; B25B 23/1422; B25F 5/001
USPC ............................................ 173/5, 178, 180
See application file for complete search history.

(56) References Cited

U.S. PATENT DOCUMENTS

| 4,006,785 | A | * | 2/1977 | Roll | B25B 23/145 173/178 |
|---|---|---|---|---|---|
| 5,738,177 | A | * | 4/1998 | Schell | B25B 23/14 173/178 |
| 8,353,363 | B2 | * | 1/2013 | Hirt | B25B 23/14 173/180 |
| 8,973,455 | B2 | * | 3/2015 | Xu | F16H 3/14 173/216 |
| 2011/0147024 | A1 | * | 6/2011 | Herr | B25B 23/141 173/48 |
| 2013/0025894 | A1 | * | 1/2013 | Campbell | B25F 5/001 173/20 |
| 2013/0105189 | A1 | * | 5/2013 | Murthy | B25B 21/00 173/178 |
| 2014/0034347 | A1 | * | 2/2014 | Lam | B25F 5/00 173/180 |

FOREIGN PATENT DOCUMENTS

DE  19737234  3/1999

* cited by examiner

*Primary Examiner* — Gloria R Weeks
(74) *Attorney, Agent, or Firm* — Norton Rose Fulbright US LLP; Gerard Messina

(57) ABSTRACT

A hand-held power tool is provided which includes a clutch housing of a torque clutch, and a planetary gear, situated in a gear housing, for transmitting a torque which is generated by a drive motor to a drive shaft. The clutch housing cooperates with the planetary gear via a pressure plate. The pressure plate is displaced in the axial direction in order to disengage the torque clutch. The axial relative motion of the pressure plate causes an axial relative motion between a switching element and an associated optical sensor, via which the drive motor may be switched off.

15 Claims, 8 Drawing Sheets

HAND-HELD POWER TOOL

FIELD OF THE INVENTION

The present invention relates to a hand-held power tool, in particular a cordless screwdriver, a screw driller, or a cordless screw driller, including a tool carrier which is settable into rotation and drivable by a drive motor via a planetary gear.

BACKGROUND INFORMATION

Hand-held power tools which include a planetary gear, such as a cordless screwdriver, a cordless screw driller, or a drill, for example, generally include a safety clutch so that the hand-held power tool does not continue turning in an uncontrolled manner when a predefined torque is exceeded. A tool including a tool carrier which is settable into rotation is provided in German Published Patent Application No. 197 37 234, for example, the tool carrier being drivable by a drive motor via a planetary gear, and the annulus gear of the planetary gear cooperating with the gear housing via a friction clutch in such a way that a relative rotation of the annulus gear with respect to the gear housing is triggered when a settable torque is reached.

In addition, cordless screwdrivers are known in which either a microswitch rests against the pressure plate, or the pressure plate has a notch, so that during an axial relative motion which is triggered by a response by the clutch, in addition an electrical signal may be generated, via the movement of the pressure plate, which interrupts the power supply to the motor.

A disadvantage of the related art is that, at the torques to be transmitted, for strength reasons the notch on the pressure plate may be implemented only with a much greater width of the device. The microswitches have a short service life, result in higher costs, are not percussion-resistant, and likewise require a larger housing for the hand-held power tool.

SUMMARY

An object of the present invention is to make improvements over the above-mentioned disadvantages and to provide a hand-held power tool which has cost-effective, flexible, and reliable torque limiting, and which preferably has a simple design and is space-saving.

This object is achieved by a hand-held power tool.

A hand-held power tool of this type includes a clutch housing of a torque clutch, and a planetary gear, situated in a gear housing, for transmitting a torque which is generated by a drive motor to a drive shaft. The clutch housing cooperates with the planetary gear via a pressure plate, the pressure plate being displaced in the axial direction in order to disengage the torque clutch. The axial relative motion of the pressure plate causes an axial relative motion between a switching element and an associated optical sensor, so that secure, reliable torque limiting may be ensured without overratcheting the torque clutch multiple times. Use of an optical sensor also saves space, so that the overall length and the overall width of the hand-held power tool do not have to be changed.

The switching element is preferably designed as a separate component, and is suspended on the pressure plate with little axial play in such a way that the switching element undergoes the same axial relative motion as the pressure plate, the connection between the pressure plate and the switching element being established via a connecting section which is inwardly situated from the pressure plate in the radial direction. This connecting section may be designed in such a way that the pressure plate has a tappet and/or a cutout which protrudes inwardly in the radial direction, so that the switching element cooperates with the tappet and/or with the cutout in such a way that an essentially play-free connection between the connecting section of the pressure plate and the switching element may be established. The optical sensor advantageously detects the axial relative motion of the switching element, via which the drive motor may be switched off.

The switching element preferably protrudes into a closed-off area of the optical sensor via a gap seal, the optical sensor being accommodated in a recess in the clutch housing with little tolerance or essentially without play. Due to the gap seal, the closed-off area is sealed with respect to the clutch housing in such a way that the optical sensor is protected from dirt, so that secure, long-term functioning may be ensured. To ensure a low-tolerance accommodation of the switching element, the clutch housing also has a groove-shaped recess in which essentially play-free guiding of the switching element may be ensured. The manufacturing costs may advantageously be reduced considerably due to situating the closed-off area in a recess in the clutch housing, and also due to the groove-shaped recess for accommodating the switching element, since no additional installation space is necessary either for accommodating the switching element or for incorporating the optical sensor.

The clutch housing advantageously has a slider, it being possible for the slider to be pushed into the optical sensor in such a way that the axial relative motion between the switching element and the optical sensor is not detectable by the optical sensor. It is particularly advantageous that the slider has a switch so that the slider may be displaced via the switch. In this way the optical sensor may be continually disconnected so that mechanical overratcheting of the torque clutch is possible when the predefined torque is reached. The use of the hand-held power tool may thus be individually adapted and flexibly set by the user.

The optical sensor is advantageously connected to a plate, the plate being mounted on the outside of the clutch housing in the radial direction, and the optical sensor protruding radially inwardly into the closed-off area, starting from the plate, the plate resting against the clutch housing in such a way that in the closed-off area the optical sensor is sealed off with respect to the clutch housing to the greatest extent possible.

In another specific embodiment, the optical sensor and the plate are mounted together on a support and form a module, the module being situated on the clutch housing so as to be displaceable via the support.

A fork light barrier is particularly advantageous as an optical sensor, since by using same, a relative motion of the switching element may be detected easily and quickly.

The pressure plate has an essentially circular design, thus enabling a space-saving, form-fit connection to the clutch housing.

In one preferred specific embodiment, the hand-held power tool is a cordless screwdriver, a drill, a percussion drill, or a hammer drill, it being possible to use a borer, a drill bit, or various bit attachments as a tool.

In general, hand-held power tools are understood to mean all hand-held power tools which include a tool carrier which is settable into rotation and drivable by a drive motor via a planetary gear, such as cordless screwdrivers, cordless drills, percussion drills, multifunctional tools, and/or screw drillers. In the present context, transmission of electrical energy is understood in particular to mean that the hand-held power tool relays energy to the tool body via a battery and/or via a power cord connection.

Further features, possible applications, and advantages of the present invention result from the following description of the exemplary embodiment of the present invention illustrated in the drawings. It is pointed out that the features described or illustrated in the figures, alone or in any arbitrary combination, constitute the subject matter of the present invention, regardless of their recapitulation in the patent claims or their back-reference, and regardless of their wording or illustration in the description or drawing, respectively, and have only a descriptive nature and are not to be construed as limiting the present invention in any way.

DETAILED DESCRIPTION

Figure 1:
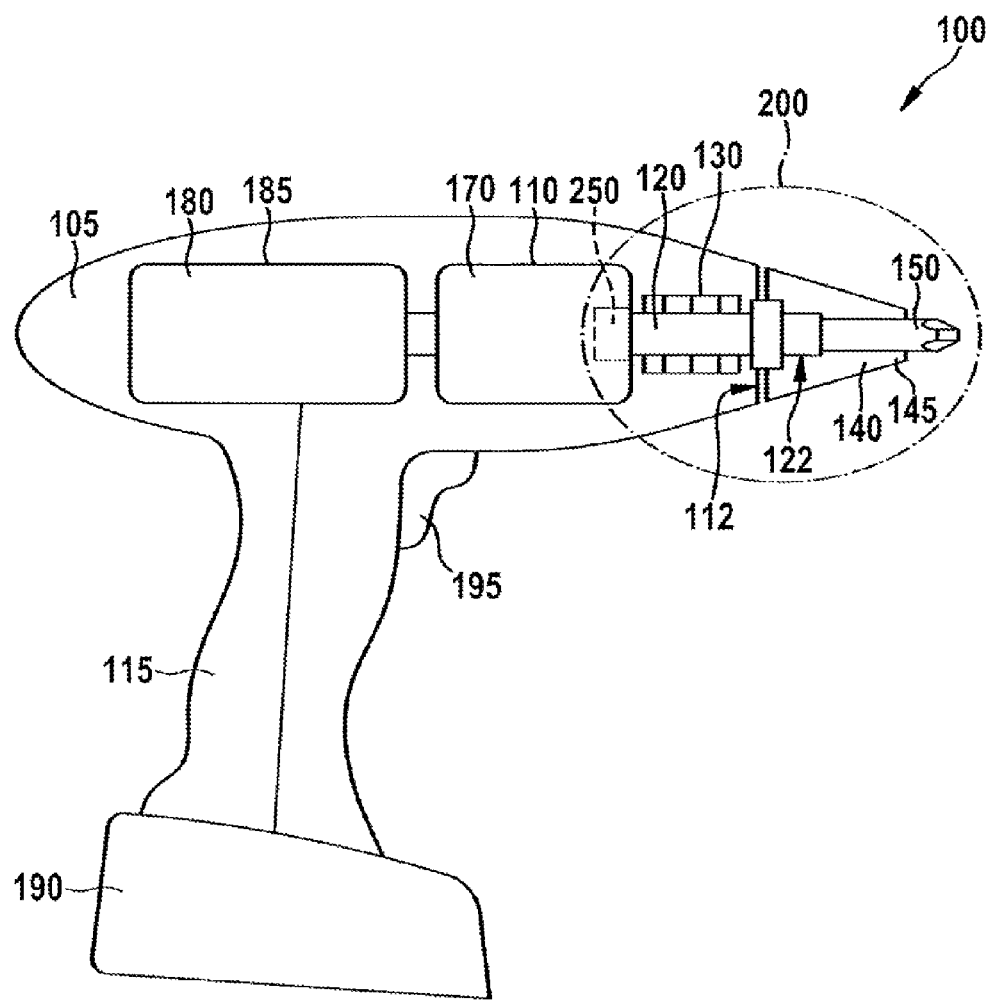
FIG. 1 shows a schematic view of an example of a hand-held power tool according to the present invention according to a first specific embodiment.

FIG. 1 shows a hand-held power tool 100 according to the present invention, which includes a housing 105 with a handle 115. According to the illustrated specific embodiment, hand-held power tool 100 is mechanically and electrically connectable to a battery pack 190 for supplying power off-grid. In FIG. 1, hand-held power tool 100 is designed as a cordless screw driller as an example. However, it is pointed out that the present invention is not limited to cordless screw drillers, and instead may find application using various hand-held power tools in which a tool is set into rotation, such as a cordless drill, a cordless percussion drill, a cordless screwdriver, or a percussion drill, etc.

An electric drive motor 180 which is suppliable with power from battery pack 190 and a gear 170 are situated in housing 105. Drive motor 180 is connected to a drive shaft 120 via gear 170. Drive motor 180 is situated in a motor housing 185 in the illustration, and gear 170 is situated in a gear housing 110; gear housing 110 and motor housing 185 are situated in housing 105 as an example.

According to one specific embodiment, gear 170 is a planetary gear which is designed with various gear stages or planetary stages, and with which a torque clutch 251 is associated. During operation of hand-held power tool 100, planetary gear 170 is rotationally driven by drive motor 180. Planetary gear 170 is described in greater detail below with reference to a schematic sectional view of a detail 200 illustrated in FIG. 2.

Drive motor 180 may be activated, i.e., switched on and off, via a hand switch 195, and may be any arbitrary type of motor, such as an electronically commutated motor or a direct current motor. Drive motor 180 is preferably electronically controllable or regulatable in such a way that reverse operation as well as input with regard to a desired rotational speed are achievable. The mode of functioning and the design of a suitable drive motor are sufficiently known from the related art, so that a detailed discussion is dispensed with here for the purpose of brevity of the description.

Drive shaft 120 is rotatably supported in housing 105 via a bearing system 130, and is provided with a tool receptacle 140 which is situated in the area of an end-face side 112 of housing 105 and which includes a drill chuck 145 as an example. Bearing system 130 may be fastened to housing 105 via associated fastening elements, for example, or may be situated in an associated element in between, such as gear housing 110 or motor housing 185. Tool receptacle 140 is used for accommodating a tool 150, and may be integrally formed on drive shaft 120 or connected to same in the form of an attachment. In FIG. 1, tool receptacle 140 has an attachment-like design and is fastened to drive shaft 120 via a fastening device 122 provided on the drive shaft.

Figure 2:
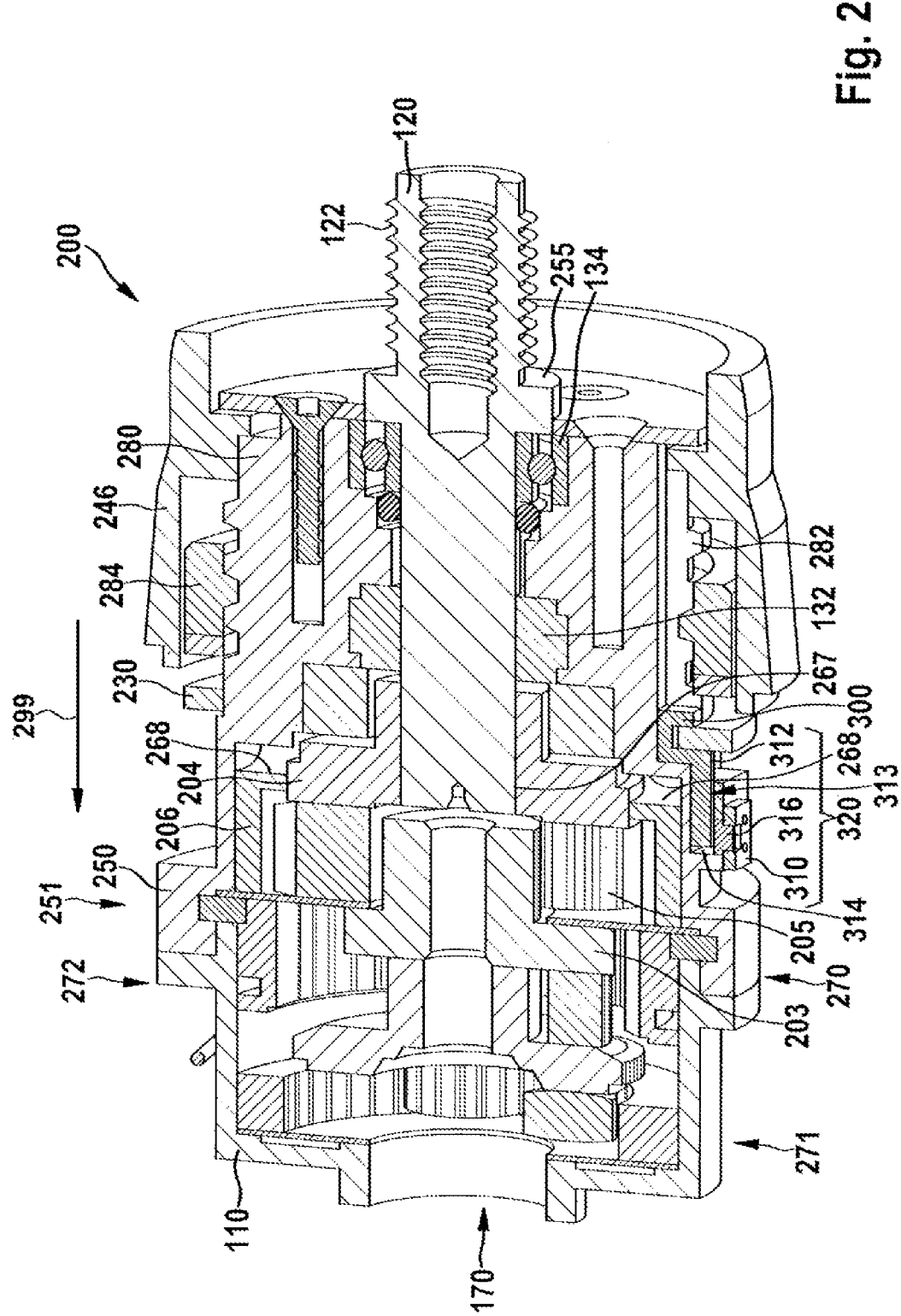
FIG. 2 shows an enlarged sectional view of a detail of the hand-held power tool from FIG. 1.

FIG. 2 illustrates detail 200 of hand-held power tool 100 from FIG. 1, in which an illustration of tool 150 and tool receptacle 140 from FIG. 1 has been omitted for clarity and simplicity of the drawing. Detail 200 illustrates an example of one embodiment of planetary gear 170, bearing system 130, drive shaft 120, and torque clutch 251.

Planetary gear 170 has three, for example, gear stages or planetary stages in gear housing 110: a front stage 270, a rear stage 271, and a middle stage 272. Front planetary stage 270 has, for example, a sun wheel 203 having gear teeth, at least one planet wheel 205 having gear teeth, a planet carrier or tool carrier 204 having a rotary entrainment contour 267, and an annulus gear 206 having gear teeth. Since the design of a planetary gear is sufficiently known to those skilled in the art, further description of planetary stages 271, 272 is dispensed with for the purpose of brevity of the description. The torque of drive motor 180 from FIG. 1 is transmitted to drive shaft 120 via planetary stages 271, 272, 270 with the aid of rotary entrainment contour 267 of tool carrier 204.

Drive shaft 120 includes fastening device 122, which in the illustration is designed as a male thread, to which drill chuck 145 of tool receptacle 140 in FIG. 1 is fastenable, it being possible to bring the male thread into thread engagement with a female thread provided on drill chuck 145, for example. According to one specific embodiment, drive shaft 120 is designed as a drive spindle having a support flange 255, so that bearings 132, 134 of bearing system 130 are used as spindle bearings. According to the illustration of one specific embodiment, bearing system 130 includes a first bearing 134 and a second bearing 132 situated at a distance from same, first bearing 134 having the design of a ball bearing, for example, and second bearing 132 having the design of a sliding bearing, for example. However, it is pointed out that other types of bearings are also usable within the scope of the present invention. Thus, bearings 132, 134 may alternatively be designed in each case as a ball bearing, sliding bearing, needle bush, roller bearing, or some other type of rolling bearing. Bearings 132, 134 are situated in a bearing sleeve or bearing bush 280 which is provided with a male thread 282, an adjusting ring 246 being rotatably supported on the bearing sleeve or bearing bush as an example. The adjusting ring is in operative engagement with an adjusting nut 284 which is rotatably supported on male thread 282 of bearing sleeve 280.

A pressure plate 230 is axially supported on adjusting nut 284. Pressure plate 230 is acted on by compression springs 238, for example, with a predefined pressing force in the direction of an arrow 299, whereby multiple pressure elements 236, which in the illustrated exemplary embodiment are pressure balls which protrude through recesses in clutch housing 250, via pressure plate 230 and are acted on with the pressing force against an end-face side 268 of annulus gear 206 facing pressure plate 230, and thus in the illustration, facing away from drive motor 180 in FIG. 1.

However, it is pointed out that pressure elements 236 are shown as pressure balls strictly as an example, and the present invention is not limited to use of such pressure balls as pressure elements 236. Instead, pressure elements 236 with alternative pressure bodies are also implementable, via which end-face side 268 of annulus gear 206 may be acted on with the predefined pressing force. At end-face side 268 of annulus gear 206, a detent surface is formed which corresponds to the number of pressure elements 236, which as an example are integrally formed on the pressure balls as bulges. In the illustrated specific embodiment, the detent surface has the design of a spherical segment. However, it is pointed out that any arbitrary design of the detent surface and of pressure element 236 is possible as long as the functionality of torque clutch 251 described below is thus achievable.

It is further pointed out that the design and the mode of operation of a planetary gear as well as the cooperation with the illustrated clutch for setting a torque are generally known, so that within the scope of the present description no further discussion is provided here.

As is apparent from FIG. 2, torque clutch 251 formed by pressure elements 236, annulus gear 206, pressure plate 230, and adjusting nut 284 or adjusting ring 246 is situated in the area of front planetary stage 270. However, this is strictly an example, and is not to be construed as a limitation of the present invention. Instead, torque clutch 251 may be designed in conjunction with any arbitrary planetary stage.

During operation of hand-held power tool 100 in FIG. 1, pressure elements 236 together with the detent surface of annulus gear 206 and of pressure plate 230 are used for blocking the detent surface of annulus gear 206 when drive shaft 120 rotates, until a predefined torque is reached, so that via pressure plate 230, annulus gear 206 is rigidly coupled to clutch housing 250 and to rotary entrainment contour 267 of tool carrier 204; i.e., these elements are not rotatable with respect to one another. For this purpose, pressure elements 236 are initially pressed by pressure plate 230 with a predefined pressing force against annulus gear 206 by the force of compression springs 238 in the direction of arrow 299, and held in an appropriate coupling or blocking position in which pressure elements 236 in the detent surface block at end-face side 268 of annulus gear 206. The pressing force of pressure plate 230 is settable by rotating adjusting ring 246, and thus adjusting nut 284, adjusting nut 284 preferably being adjustable or rotatable in such a way that in a so-called "coupling" it may completely, i.e., independently of torque, prevent or block an axial displacement of pressure plate 230. Alternatively, for this purpose a suitable blocking element for limiting an axial displacement of pressure plate 230 may be used in order to block the blocking element in the drill setting.

In the clutch mode of torque clutch 251, gear tooth friction forces and/or bearing friction forces of planet wheels 205 which are a function of a torque transmitted to drive shaft 120 act between the gear teeth. These friction forces counteract an axial movement of pressure plate 230, and thus have a supporting function for compression springs 238, so that they may be designed with comparatively low elastic forces. This in turn allows comparatively weakened locking of adjusting ring 246 to bearing sleeve 280, since a corresponding recovery tendency of adjusting nut 284 due to the low elastic forces of compression springs 238 may be at least reduced. Thus, relatively small operating forces are required for activating adjusting ring 246.

When the predefined torque is reached, for disengaging torque clutch 251, pressure elements 238 and the bulges of the detent surface at end-face side 268 of annulus gear 206 cause an axial displacement of pressure plate 230 against the above-mentioned friction forces and the elastic forces of compression springs 238, pressure elements 238 being moved over the associated bulges of the detent surface in the manner of a ratchet motion. The coupling between annulus gear 206 and clutch housing 250 of torque clutch 251 is thus disconnected, so that a rotation of annulus gear 206 in gear housing 110 relative to tool carrier 204 is made possible.

In addition, FIG. 2 shows a switching element 300 and an optical sensor 310, associated with switching element 300, which in the illustrated exemplary embodiment is designed as a fork light barrier. Switching element 300 is engaged with essentially circular pressure plate 230 with little axial play in such a way that the axial relative motion of pressure plate 230 results in the same axial relative motion between switching element 300 and associated optical sensor 310. The connection between pressure plate 230 and switching element 300 is established via a connecting section 307 which is situated inwardly from pressure plate 230 in the radial direction, and which in the specific embodiment illustrated in FIG. 2 is designed as a tappet 308. In addition, clutch housing 250 has a groove-shaped recess 313 which is designed in such a way that guiding of switching element 300 which is as play-free as possible may be ensured. In this way, switching element 300 may transmit the axial relative motion of pressure plate 230 so that optical sensor 310 may reliably and precisely detect any axial relative motion of switching element 300 or of pressure plate 230.

The clutch housing 250 also has a recess which ensures the accommodation of optical sensor 310 which is play-free to the greatest extent possible. Optical sensor 310 is connected to a plate 316 which is outwardly mounted on clutch housing 250 in the radial direction. Starting from plate 316, optical sensor 310 protrudes inwardly in the radial direction into the recess in clutch housing 250, plate 316 resting against clutch housing 250 in such a way that optical sensor 310 is sealed with respect to clutch housing 250 to the greatest extent possible and forms a closed-off area 314.

Switching element 300 protrudes beyond groove-shaped recess 313 in clutch housing 250 into closed-off area 314 of optical sensor 310, closed-off area 314 being sealed with the aid of a gap seal 312 in such a way that optical sensor 310 is optimally protected from dirt. When the predefined torque is reached, the axial relative motion of pressure plate 230 causes optical sensor 310 to detect same, thus switching off the power supply to drive motor 180. Alternatively, short-circuiting of drive motor 180 is also conceivable, thus allowing a very short braking time to be achieved.

Figure 3:
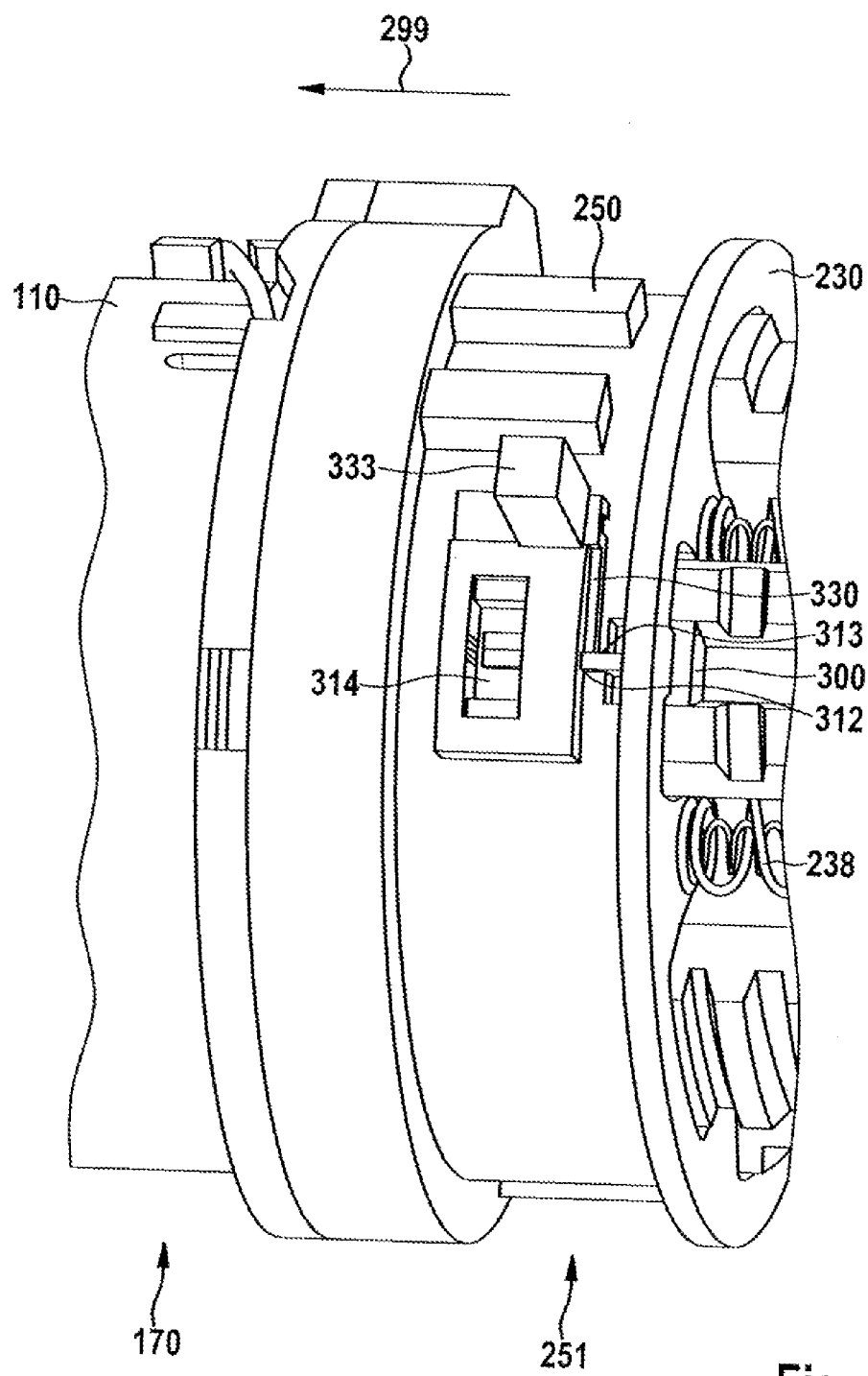
FIG. 3 shows a schematic perspective view of a configuration of a pressure plate and a switching element.

FIG. 3 illustrates gear housing 110, clutch housing 250, and pressure plate 230 together with switching element 300, but without optical sensor 310 and plate 316. Area 314, which normally is sealed off by the plate, is thus apparent, into which switching element 300 protrudes via a gap seal 312. Pressure plate 230 is acted on with a predefined pressing force by compression springs 238 in the direction of an arrow 299. In addition, clutch housing 250 includes a slider 330 which is connected via a connecting member 333 to a switch 332, not illustrated, and which may be moved into area 314 in such a way that an axial relative motion between switching element 300 and optical sensor 310 is no longer detectable by optical sensor 310. When the predefined torque is reached, as the result of slider 330, optical sensor 310 is thus no longer able to detect the axial relative motion of switching element 300, drive motor 180 is not switched off, and pressure elements 238 are moved over the associated bulges of the detent surface in the manner of a ratchet motion. The coupling between annulus gear 206 and clutch housing 250 of torque clutch 251 is thus disconnected, thus allowing a rotation of annulus gear 206 in gear housing 110 relative to tool carrier 204.

Figure 4:
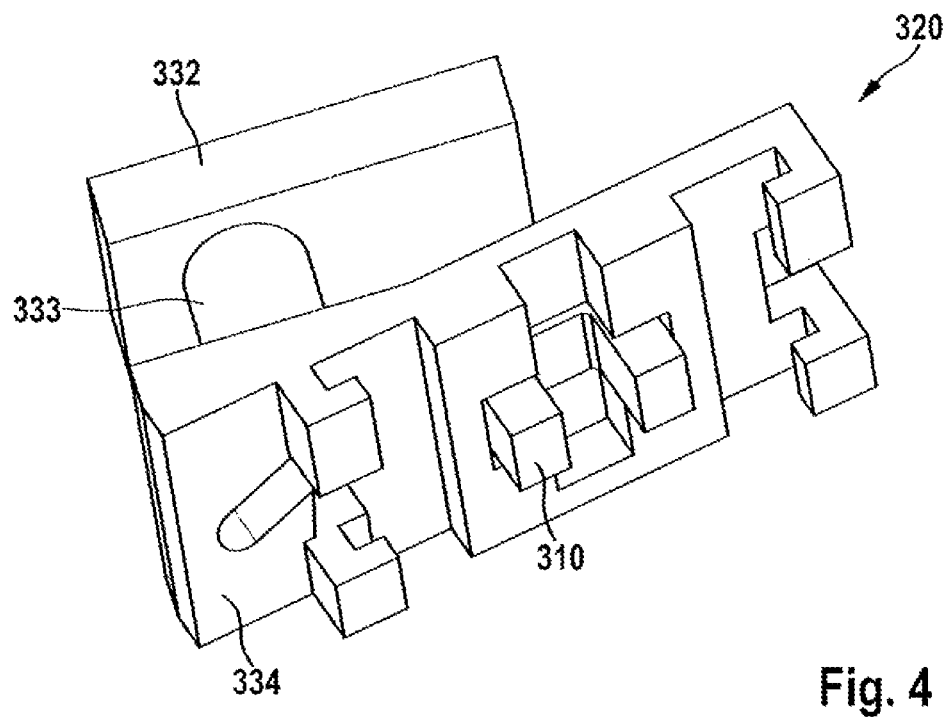
FIG. 4 shows a schematic perspective view of a module.
Figure 5:
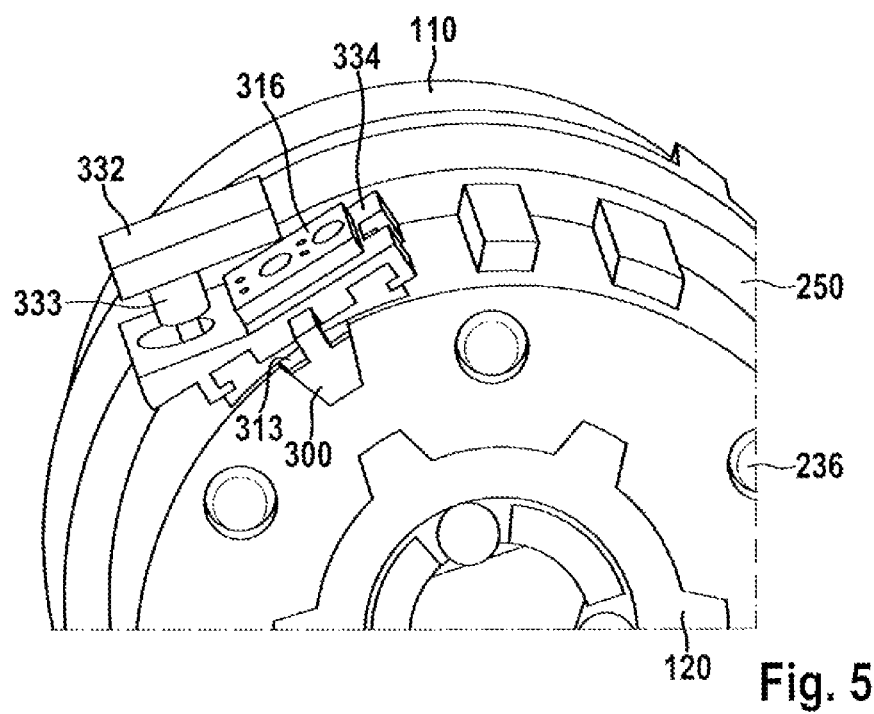
FIG. 5 shows a schematic perspective view of a configuration of the module from FIG. 4 on a clutch housing.
Figure 6:
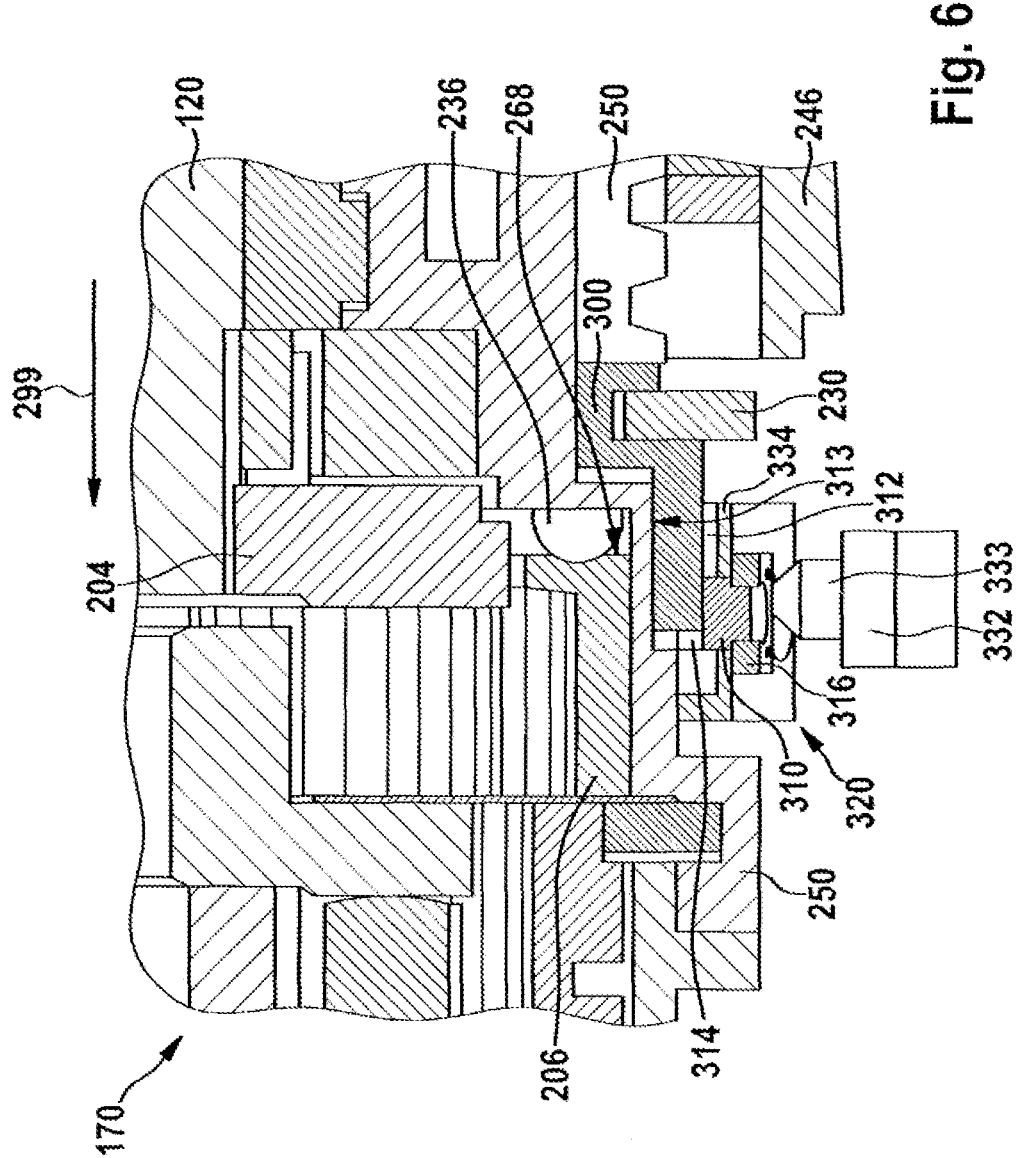
FIG. 6 shows a schematic sectional view of a configuration of the module from FIG. 4 on a clutch housing, in a first position.
Figure 7:
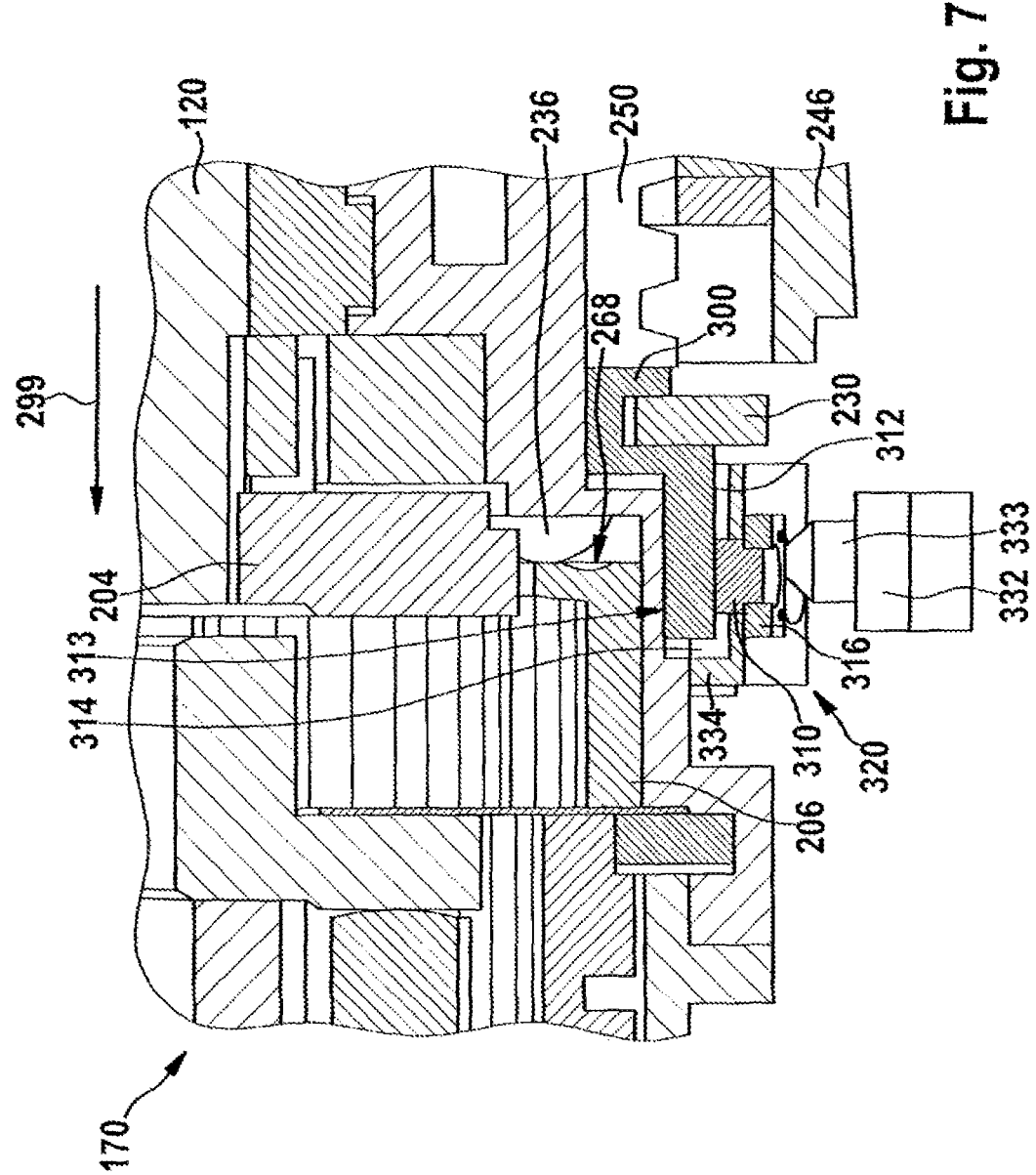
FIG. 7 shows a schematic sectional view of a configuration of the module on a clutch housing, in a second position.

Alternatively, it is also possible for optical sensor 310, plate 316, and switch 332 to be connected to a support 334 via connecting member 333, as illustrated in FIGS. 4 and 5, and to form a module 320, whereby module 320 may be situated so as to be displaceable on clutch housing 250. In order to switch off drive motor 180 when the predefined torque is reached, module 320, as illustrated in FIG. 5, may be positioned in such a way that an axial relative motion of switching element 300 may be detected. However, in order for drive motor 180 to remain switched on and torque clutch 251 to be disengaged by mechanical overratcheting when the predefined torque is reached, module 320, as illustrated in FIG. 7, may be moved toward pressure plate 230 against the direction of arrow 299, and thus over switching element 300, so that an axial relative motion between switching element 300 and optical sensor 310 is no longer detectable by optical sensor 310, and drive motor 180 remains switched on even when the predefined torque is reached, and an overratcheting of torque clutch 251 then takes place as described above.

Figure 8:
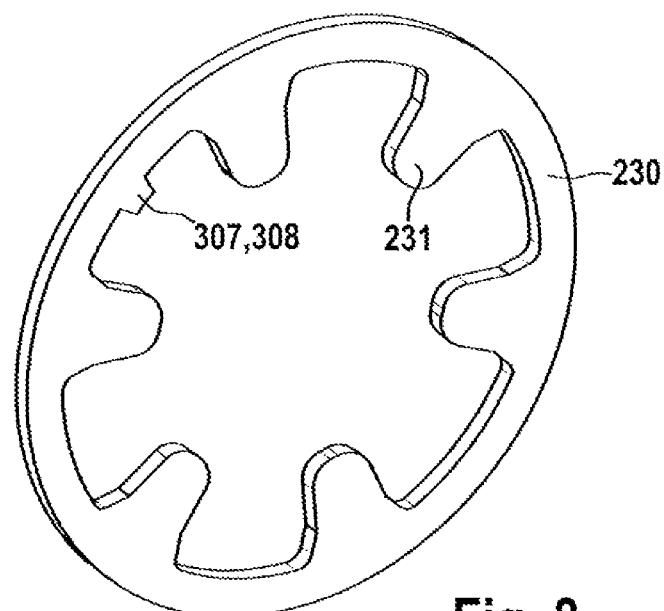
FIG. 8 shows a schematic perspective view of a pressure plate in a first variant.
Figure 9:
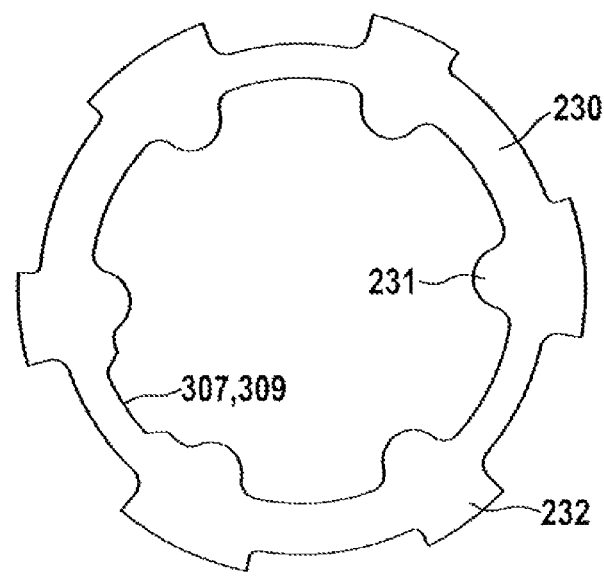
FIG. 9 shows a schematic perspective view of a pressure plate in a second variant.

FIG. 8 shows one possible specific embodiment of a pressure plate 230 together with connecting section 307. In this specific embodiment, pressure plate 230 has six radially inwardly facing bulges 231 which cooperate with pressure elements 236 and compression springs 238 in such a way that a predefined torque may be set via adjusting nut 284, and planar axial blocking of pressure plate 230 takes place when the torque is reached. In addition, pressure plate 230 includes a connecting section 307. Connecting section 307 is designed as a tappet 308, and is situated inwardly in the radial direction, so that a connection of switching element 300 may take place without weakening pressure plate 230. Alternatively, as illustrated in FIG. 9, pressure plate 230 may also include multiple radially outwardly facing segments 232, so that segments 232 cooperate directly with adjusting ring 246 when the torque is reached. In this specific embodiment, pressure plate 230 has a cutout 309 as a connecting section 307, so that the connection of switching element 300 takes place via this cutout 309.

Figure 10:
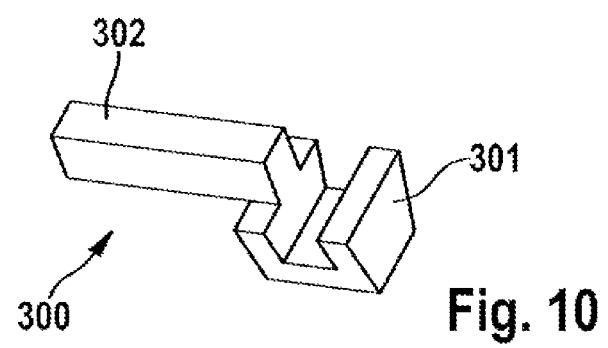
FIG. 10 shows a schematic perspective view of a switching element.
Figure 11:
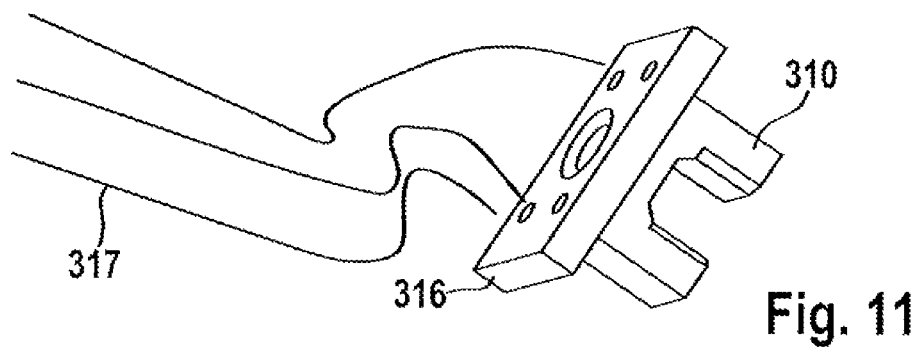
FIG. 11 shows a schematic perspective view of an optical sensor.

Switching element 300 is illustrated in FIG. 10, whereby switching element 300 may accommodate connecting section 307 on pressure plate 230 at a first side 301 in a form-fit manner, and at a second side 302 may protrude into area 314 of clutch housing 250 illustrated in FIG. 3 and may cooperate with optical sensor 310. As illustrated in FIG. 11, optical sensor 310 is designed as a fork light barrier and is connected to a plate 316. Plate 316 may be connected to a control system of drive motor 180 via cables 317. It is pointed out in principle that the shape of connecting section 307 as well as the design of switching element 300 or of optical sensor 310 are shown strictly as examples, and the present invention is not limited to use of the design of switching element 300 and of connecting section 307. Instead, the design of switching element 300 is implementable in any arbitrary manner, it being crucial to ensure an optimal connection between switching element 300 and connecting section 307 of pressure plate 230, and optimal cooperation with optical sensor 310 as illustrated in FIG. 11, for example.

In addition to the specific embodiments which are described and illustrated, other specific embodiments are conceivable which may include further modifications and combinations of features.

What is claimed is:

1. A hand-held power tool, comprising:
   a clutch housing of a torque clutch;
   a gear housing;
   a drive motor;
   a drive shaft;
   a switching element;
   an optical sensor associated with the switching element;
   a pressure plate displaced in an axial direction in order to disengage the torque clutch; and
   a planetary gear situated in the gear housing and for transmitting a torque which is generated by the drive motor to the drive shaft, wherein:
   the clutch housing cooperates with the planetary gear via the pressure plate, and
   an axial relative motion of the pressure plate causes an axial relative motion between the switching element and the associated optical sensor.

2. The hand-held power tool as recited in claim 1, wherein:
   the switching element is a separate component, and
   the switching element is suspended on the pressure plate with little axial play in such a way that the switching element undergoes the same axial relative motion as the pressure plate.

3. The hand-held power tool as recited in claim 1, wherein:
   the pressure plate has a connecting section that is inwardly situated in a radial direction, and
   a connection between the pressure plate and the switching element is established via the connecting section.

4. The hand-held power tool as recited in claim 3, wherein:
   the connecting section includes a tappet that protrudes inwardly in the radial direction, and
   the switching element accommodates the tappet in a form-fit manner in such a way that an essentially play-free connection between the pressure plate and the switching element is established.

5. The hand-held power tool as recited in claim 3, wherein:
   the connecting section has a cutout, and
   the switching element accommodates the cutout in a form-fit manner in such a way that an essentially play-free connection between the pressure plate and the switching element is established.

6. The hand-held power tool as recited in claim 1, wherein the optical sensor detects the axial relative motion of the switching element, via which the drive motor may be switched off.

7. The hand-held power tool as recited in claim 1, wherein the switching element protrudes into a closed-off area of the optical sensor via a gap seal (312).

8. The hand-held power tool as recited in claim 1, wherein:
   the clutch housing includes a slider, and
   the slider is capable of being pushed into the optical sensor in such a way that the axial relative motion between the switching element and the optical sensor is not detectable by the optical sensor.

9. The hand-held power tool as recited in claim 8, wherein the slider includes a switch, the slider being displaceable via the switch.

10. The hand-held power tool as recited in claim 1, further comprising a further plate, wherein the optical sensor is connected to the further plate.

11. The hand-held power tool as recited in claim 10, wherein the further plate is mounted on an outside of the clutch housing in the radial direction.

12. The hand-held power tool as recited in claim 10, wherein the further plate rests against the clutch housing in such a way that the optical sensor is sealed off with respect to the clutch housing to the greatest extent possible.

13. The hand-held power tool as recited in claim 10, wherein the optical sensor and the further plate are fastened together on a support and form a module, the module being displaceably situated on the clutch housing.

14. The hand-held power tool as recited in claim 1, wherein the optical sensor is a light barrier.

15. The hand-held power tool as recited in claim 1, wherein a mechanical overratcheting of the torque clutch is possible when the optical sensor is continually interrupted.

\* \* \* \* \*